Figure 1:
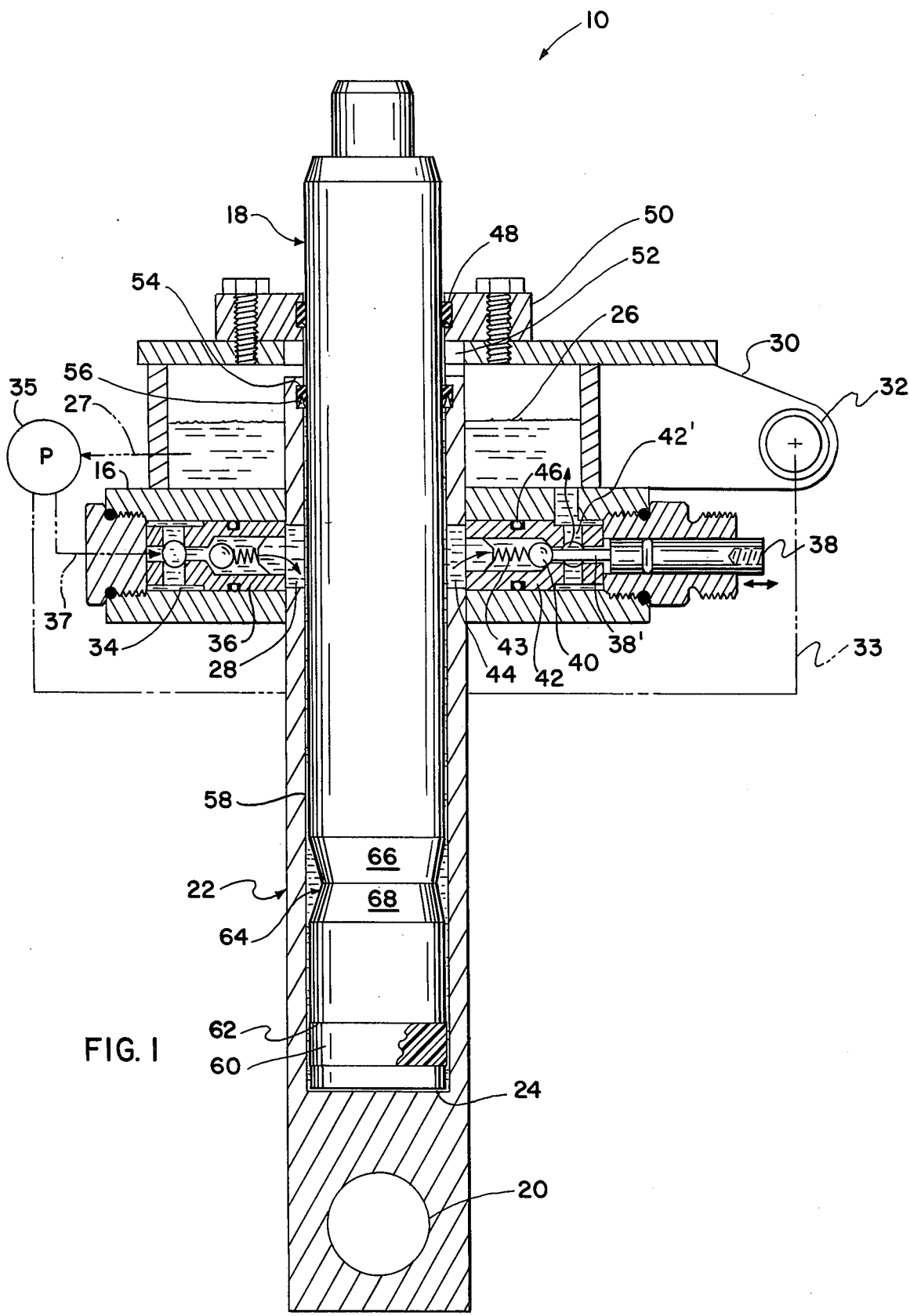

United States Patent [19]

Caldwell

[11] 4,075,931
[45] Feb. 28, 1978

[54] LIFT-JACK FLUID MOTOR FOR HYDRAULIC LIFT TRUCKS

[76] Inventor: Melvin R. Caldwell, R.F.D. No. 1, Millersville, Pa. 17551

[21] Appl. No.: 771,771

[22] Filed: Feb. 24, 1977

Related U.S. Application Data

[63] Continuation-in-part of Ser. No. 620,865, Oct. 9, 1975, abandoned.

[51] Int. Cl.$^2$ ............... F15B 15/22; F15B 13/042
[52] U.S. Cl. .................................. 91/402; 91/454; 92/142
[58] Field of Search ............ 91/402, 400, 325; 92/142

[56] References Cited

U.S. PATENT DOCUMENTS

| 787,136 | 4/1905 | Warren | 91/402 |
|---|---|---|---|
| 1,876,024 | 9/1932 | Rosenberry | 91/402 |
| 2,624,320 | 1/1953 | Williams | 91/402 |
| 3,818,805 | 6/1974 | Johansson | 91/402 |
| 3,975,986 | 8/1976 | Barth et al. | 91/402 |

FOREIGN PATENT DOCUMENTS

| 1,289,212 | 2/1962 | France | 91/401 |
|---|---|---|---|
| 1,052,405 | 12/1966 | United Kingdom | 91/402 |

*Primary Examiner*—Paul E. Maslousky
*Attorney, Agent, or Firm*—John F. McClellan, Sr.

[57] ABSTRACT

An expanding chamber hydraulic motor venting through a working member reduces the motor/stroke-limiting venting valve assembly to three simple components: a cup-shaped cylinder, an annular gasket at the open end of the cylinder, and undersize piston sufficiently loose in the cylinder to provide free-flow of hydraulic fluid therebetween but protruding through the gasket in a sealing fit; in operation, fluid pressure introduced by conventional means between the piston and cylinder can force the piston to extend from the cylinder only within a maximum stroke length limited by an annular groove around the piston which when it reaches the gasket vents the pressure past the gasket.

3 Claims, 2 Drawing Figures

LIFT-JACK FLUID MOTOR FOR HYDRAULIC LIFT TRUCKS

This application is a continuation-in-part of my co-pending application Ser. No. 620,865, filed Oct. 9, 1975 for LIFT-JACK FLUID MOTOR FOR HYDRAULIC LIFT TRUCKS, and abandoned upon the filing of this continuation-in-part application.

This invention relates generally to expanding chamber motors and specifically to expanding chamber motors which vent through working members.

A principal object of the invention is to provide a combined expanding chamber motor/stroke limiting valve assembly which affords simplicity of operation, simplicity of fabrication, low cost, long wear, reliability, and easy inspection, operation and repair, and which is failsafe and particularly adapted for hydraulic lift truck applications.

In the prior art numerous stroke limiting valve arrangements are provided, including those of the following patents:

French Pat. No. 1,289,212 Feb. 9, 1962 U.S. Pat. Nos. 1,488,267; J. M. Meyers; Mar. 25, 1924 U.S. Pat. No. 1,965,419; C. E. Lipman; July 3, 1934 U.S. Pat. No. 2,520,426; J. J. Mueller Aug. 29, 1950.

The French patent discloses an input and outlet in a cylinder, with a piston having an annular groove connected through a bore with the pressure end of the piston and spaced from it a distance causing release of pressure at the end of the stroke through the outlet. This arrangement would obviously require considerably more fabrication than the above invention, and fails to provide flow advantages and other advantages of the present invention.

The Meyers patent discloses a pneumatic cylinder and piston arrangement with pressure release opening in the cylinder limiting travel of the piston venting the cylinder when the piston passes the openings at the end of the stroke.

The Lipman patent discloses a "pressure unloader" valve which in various embodiments employs holes in the cylinder and the piston to unload the pressure.

The Mueller patent discloses pressure relief at the end of a piston stroke by means of an annular valve, operated by striking cylinder structure.

In addition to the above, attention is called to the references cited in the parent application and to the differences noted there between these and applicant's invention.

Further objects of the present invention are to provide a device as described which is compact, which contains but one pressure-seal between piston and cylinder, which in operation periodically flushes and lubricates the one pressure-seal, which self-centers on venting, and which accommodates pumps, and stroke velocities, and stroke lengths of all magnitudes without possibility of vent jamming.

Still further objects are to provide a device as described which provides optional locations along the length of the cylinder for pump and for relief connections, which is substantially immune to warpage during installation or repair, and which is uniformly responsive in operation.

In brief summary given for cursive descriptive purposes only, the invention includes a coaxial annular-venting provision for stroke-limiting in a piston-cylinder assembly attained by means of a cylinder gasket bypassed by a piston groove.

Figure 2:
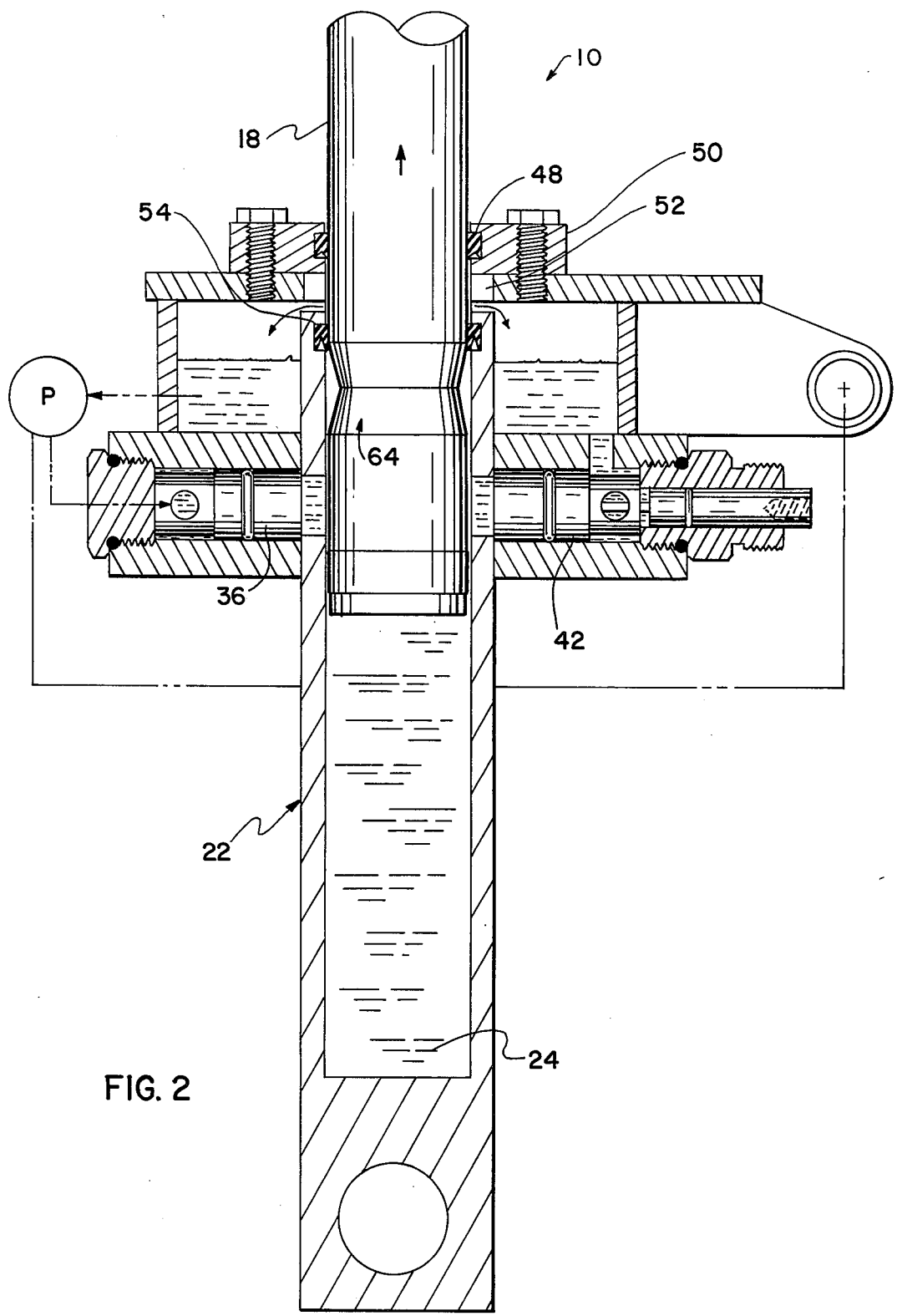

The above and other objects and advantages of the invention will become more apparent on examination of the following description, including the drawings in which:

FIG. 1 is a side elevational sectional view showing the invention in a first position of operation; and FIG. 2 is a side elevational sectional view showing the invention at the stroke-limit during operation.

In the drawings like reference numerals indicate like parts.

FIG. 1 shows the invention 10 as embodied in a hydraulic lift truck application for purposes of load lifting. Housing 16 comprises generally a weldment which may be of mild steel.

CONVENTIONAL PROVISIONS

The load, not shown, in the form of the gooseneck of an elevatable lift-truck bed, is carried at the top of the piston 18, in conventional manner.

The bottom of the invention 10 conventionally provides for connection by a hole 20 in the lower end of cylinder 22 to the front wheel assembly, not shown, of a lift truck.

Forced expansion of the chamber 24 between the lower-end of the piston and the bottom of the cylinder, forcing the piston out of the cylinder, lifts the load by increasing the distance between the top of the piston and the hole in the lower end of the cylinder in accordance with standard practice.

Hydraulic fluid is supplied under pressure from reservoir 26 to the cylinder inlet 28 by conventional means represented by bracket 30 provided with a bearing 32 for mounting a pump handle and mechanical connection schematically represented by phantom line 33, upon oscillation of which a pump 35 draws a hydraulic fluid from reservoir 26 through intake line 27 and forces it into valve chamber 34 through pressure line 37, and from there through a first ball-check-valve 36 to the cylinder inlet which passes the hydraulic fluid through the cylinder wall into the cylinder.

To release the pressure anywhere within the operating range of the piston, collapsing chamber 24 under the piston and lowering the piston, plunger 38 and integral extension 38' are advanced as by conventional hand or foot-operated release cam, not shown, unseating ball check 40 of a second ball-check valve, lowering-valve 42, against back-pressure and the pressure of keep-held spring 43, permitting hydraulic fluid to escape from cylinder exhaust 44 through channels 42' in the valve into the reservoir, which is at atmospheric pressure. The check valves are conventional and preferably are identical and unitary in construction; each has a circumferential "O" ring seal 46 to prevent bypassing. Splash guard 48 held by ring 50 around opening 52 in the top of the reservoir prevents the hydraulic oil in the reservoir from splashing out or from spraying out as will be seen.

STRUCTURAL PROVISIONS OF THE INVENTION

According to provisions of this invention, piston 18 and cylinder 22 are both circular in section, but do not form the usual running fit. Instead, the piston outside-diameter clears the cylinder inside-diameter sufficiently to provide substantially shear-free flow of hydraulic fluid between the two. The only running seal is between the piston outer diameter and a "V"-section skirt annular gasket 54 held in gasket groove 56 in the cylinder bore proximate to open end.

Hydraulic fluid from cylinder inlet 28 freely passes downward in the space 58 around the piston to reach chamber 24 and on release of pump pressure passes under load pressure upward in the same space to return through cylinder exhaust 44 to the reservoir.

Preferably, a sleeve 60 is fitted on the lower end of the piston, which is reduced in diameter and provided with a shoulder 62 as shown. However, this sleeve does not close the bore of the cylinder, but instead leaves clearance for passage of hydraulic fluid. The sleeve, which may be of a suitably in solvent low friction material such as "Parker Molyguard", or of "Teflon", lessens chance of injury to the annular gasket on assembly, and lessens friction if the cylinder and piston are cramped into contact by unbalanced loads during operation.

Assembly is simple. The annular gasket is flexed into place, then the lower end of the piston is simply inserted into the upper end of the cylinder and forced down.

To prevent ejection of the piston from the cylinder by pumping during load lifting, an annular recess 64 or vent groove is provided around the piston adjacent the lower end. Preferably this groove defines an upper ring or slope 66 tapered downwardly and inwardly, for reasons of smooth operation to be noted in explanation of operation of the invention. Further, for smooth operation, including assembly and dismantling, the groove preferably also similarly defines a lower ring 68 tapered downwardly and outwardly, the two forming an hourglass shape as result of the groove being in section a shallow "V" groove.

Fabrication of the running parts is especially economical. The cylinder 22 need not be internally ground and the groove 56 for the inverted "V"-section gasket (the only internal detailing) can be lathe-turned in one setup. The piston 18 can be speedily lathe-turned in one set-up to form the stepped top, the vent groove 64 and the sleeve seat structure represented by the shoulder 62, and can then conveniently be centerless ground on the outer diameter to provide maximum wear of the gasket. As previously indicated, tolerances are made loose by the provisions of the invention; for example, the vent groove 64 need have no particular axial length, the length should be longer than the length of the annular gasket 54 but is not critical, although a generous groove is preferred as giving additional safety factor by providing higher flow between inlet and gasket for reasons given in reference to the next Figure. Height of the cylinder inlet and exhaust can be as shown, or at a higher or lower location to suit particular needs, without unduly affecting performance.

OPERATION OF THE STROKE LIMITING PROVISION

FIG. 2 shows the invention at the upper end of piston travel; at this position vent groove 64 limits the stroke by venting hydraulic fluid (arrows) past the annular gasket 54. This venting occurs at 360° around the gasket, is smooth and positive, and the quantity of hydraulic fluid flushed past the gasket will increase as the piston rises, proportionally balancing out any pumping increase, and centering the upper end of the piston in the cylinder.

Regardless of particulate impurities in the hydraulic fluid this venting provision cannot jam and overload the system, there being no place for matter to accumulate. Flushing will tend to clear the gasket of particulate matter which might cause wear. It will be noted that the vent groove has no sharp shoulders to damage the annular gasket, whether going up or down past the pressure-expanding skirt of the gasket which defines the seal. Inspection and seal replacement are also very simple, the splash guard 48 which fits the piston and prevents vented fluid from spraying out, and the ring 50 which holds it, are removed as a unit, exposing the piston-sealing annular gasket 54 for inspection through the relatively larger hole 52 in the reservoir top. To replace the gasket, the piston is drawn out, a new gasket is substituted and the piston is thrust back into place. No adjustments are necessary on initial assembly or repair, or at any other time since there is nothing to get out of adjustment per the design of this invention.

Finally, it will be noted that the design of this invention offers versatility in easy conversion to shorter stroke by simply lathe-turning the piston to raise the location of the annular recess slope 66. Further, if a longer stroke is needed, it can be provided simply by splicing in an additional length of piston and of cylinder.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In an expanding chamber fluid motor for load lifting in hydraulic lift trucks and the like, including: a cylinder having upper and lower ends, the upper end of the cylinder open, means closing the lower end of the cylinder, means for attaching the cylinder for load pickup, a piston in and supported by the cylinder in openly spaced relation with the interior of the cylinder, the piston extending upwardly from the cylinder in position for said load lifting, a gasket proximate the upper end of the cylinder sealing the space between the cylinder and the piston, means for forcing fluid into said space between the cylinder and the piston and thereby causing piston travel extending the piston further from the cylinder; and means for limiting piston travel by releasing said forced fluid between said gasket and piston at a predetermined location in the travel of the piston including the piston having structure defining an annular recess around the periphery of the piston with a portion of the annular recess tapering inward downwardly, the improvement comprising, the annular recess proportioned for and located along the piston in position for releasing said forced fluid in a 360° arc above said gasket and over the periphery of the upper end of the cylinder, the length of the annular recess in an axial direction relative to the piston and cylinder being greater than that of said gasket, and a portion of the piston remaining below the gasket and supported by the cylinder at said position for releasing the forced fluid.

2. In a fluid motor as recited in claim 1, the gasket having a "V" section skirt having a lower edge flexibly coacting with the piston and the annular groove as a valve.

3. In a fluid motor as recited in claim 2, the piston having a lower end with a non-metallic sleeve therearound, the sleeve having clearance therearound providing for free flow of fluid between the non-metallic sleeve and said cylinder.

* * * * *

UNITED STATES PATENT AND TRADEMARK OFFICE
CERTIFICATE OF CORRECTION

PATENT NO. : 4075931
DATED : February 28, 1978
INVENTOR(S) : MELVIN R. CALDWELL

It is certified that error appears in the above-identified patent and that said Letters Patent are hereby corrected as shown below:

[73] Assignee: Ross Engineering Co., Leola, Pa.

Signed and Sealed this

Fifteenth Day of August 1978

[SEAL]

Attest:

RUTH C. MASON
*Attesting Officer*

DONALD W. BANNER
*Commissioner of Patents and Trademarks*